Patented Dec. 1, 1942

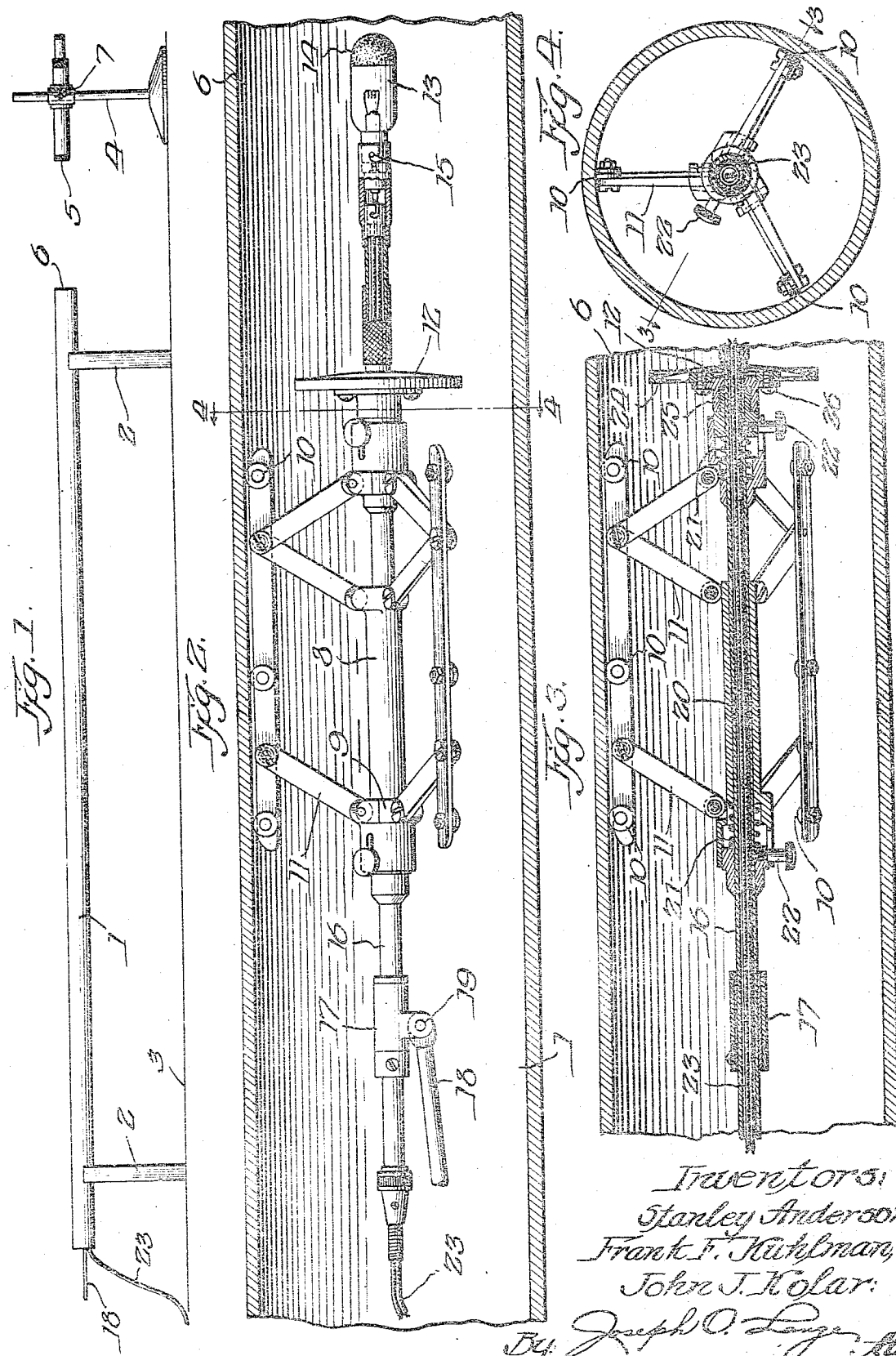

2,304,045

UNITED STATES PATENT OFFICE 2,304,045

BORE REFLECTOSCOPE

Stanley Anderson, Chicago, Frank F. Kuhlman, La Grange, and John J. Kolar, Berwyn, Ill., assignors to Crane Co., Chicago, Ill., a corporation of Illinois Application February 20, 1941, Serial No. 379,804

2 Claims. (Cl. 88—14)

More particularly, this invention pertains to a device designed especially for the purpose of inspecting the interior surfaces of pipe, tubing, joints and connections for determination of defects, such as pitting, folds, and the like surface imperfections. It is primarily adapted for use in such cases in which it is desired to view and to inspect in detail the interior surfaces of articles which ordinarily are not accessible to the observer.

Heretofore, devices available for this purpose have had the objection that a clear and unobstructed view constantly of the entire inner circumferential expanse of the wall was not possible, as the visual inspection proceeded longitudinally along the tube. Thus it will be apparent that during the course of such visual inspection of the circumferential surfaces it was quite likely that certain sections of the interior of the tube would be overlooked, in view of the fact that the usual tube inspecting device heretofore employed necessarily required being revolved while advancing it into the pipe in order to permit a complete circumferential view of the tube inner surface. Briefly, prior bore reflectoscopes have had the objection of permitting obstructed views to occur, which was serious especially if the reflectoscope was not rotated carefully in order to view every fractional square inch of circumferential surface. As a result, it has been found that frequently the visual inspection resorted to was not sufficiently thorough or complete and defects in the pipe surface were frequently overlooked.

In overcoming these objections, the most important advantage derived from the use of our structure lies in the fact that a longitudinal section of the entire internal circumference of the tube or pipe is viewable at a single setting of the instrument within the tubing. Previous types of similar inspection devices have featured the use of a reflecting mirror or prism which required its being rotated in the tube so as to ultimately furnish the desired three hundred sixty degrees of surface inspection. Briefly, we have accomplished the important advantage of having an uninterrupted view of the entire three hundred sixty degrees of wall section at all times, as the device is advanced into the tube.

Another important advantage of our invention resides in the use of a curved or convex mirror mounted with its optical axis approximately in coincidence with the central axis of the tubing to be inspected, and for our purpose we have found it desirable to use the convex surface of a mirror, the convex surface being formed preferably as a spherical segment, although other forms of curved surfaces, such as a conical surface, would also be suitable.

Another important object is to provide for desirable oblique illumination whereby the presence of pits, bumps, cracks and the like by the formation of shadows is more easily detectable than heretofore.

Another important object lies in the mounting of a single incandescent lamp preferably from the mirror carriage and placed within the tube in front of the mirror substantially in line with the central axis of the tubing to supply the desired oblique type of illumination. A further advantage lies in that where irregularities, differing in color or reflectance from the tube wall, are present, illumination by means of a centrally positioned gaseous discharge lamp may be employed.

Another important advantage of our invention lies in the relatively portable manner of positioning in which the incandescent lamp may be mounted upon the mirror carriage. As hereinafter described in detail, with the base of the lamp toward the mirror the usual supports which ordinarily have cast objectionable shadows on the tubing walls are dispensed with. By this provision, as hereinafter described in greater detail, useful light passes through that part of the bulb, between its socket and the bulb circumference, which is level with the filament.

Another important object lies in the provision for a light bulb preferably being hooded on its end portion thereby deflecting light rays onto the reflector and thus giving depth to a surface defect, whereby the user is enabled to distinguish more readily between scale, rust spots or other defects.

We are aware that there are numerous other advantages arising from the use of our invention, and these further novel features of our invention will be apparent from the following description taken in connection with the accompanying drawing, in which Fig. 1 is a general exterior view of a tubing or pipe assembly ready to be inspected, together with the telescope set in position for such observation.

Fig. 2 is an enlarged sectional view of the tubing interior showing the inspection device in position.

Fig. 3 is a fragmentary sectional view of the apparatus.

Fig. 4 is a sectional view taken on the line 4—4 of Fig. 2.

Similar reference characters refer to similar parts throughout the several views.

Referring now to Fig. 1, the pipe or tubing 1 selected for inspection of its inner peripheral surface is mounted upon the supports 2, the latter members being supported upon the floor designated 3, with the conventional telescope 4 placed with its sight 5 in axial alignment with the opening 6 of the tubing 1. Frequently this tubing 1 may be 40 feet to 60 feet in length, and before further fabrication is done, such as flanging, bending, or threading, it is essential to determine whether or not visible defects are present which might form the basis for subsequent rejection. Accordingly, the telescope is preferably held by an adjustable clamp 7 which is so supported that the telescope may be brought to the central axis of the tubing and along the latter line the sight may be directed. With this general arrangement, the telescope 4 is ready for use in inspecting the pipe interior surface through the opening 6 in cooperation with our novel device for viewing the interior surfaces of the tubing easily and clearly through the telescope.

As to a general description of our device, attention is now directed to Fig. 2. In order to illuminate the interior of the tubing so that defective joints and the other imperfections in the pipe previously referred to may be viewed through the telescope, provision is made for a movable lamp generally designated 8 having the radially extending carriage mounting 9 preferably provided with the rollers 10. The aforesaid rollers by means of the pivotably movable levers 11 are adjustable to fit snugly within the interior of the tubing 1 for the purpose of guiding the carriage 9 which is provided at one end with a preferably circular mirror 12 with a convex silvered portion upon which the bulb 13 is mounted. Preferably the base mounting of the bulb is arranged so as to pass through an apertured portion marking the center axis of the convex mirror or reflector 12, as more clearly shown in Fig. 3. Thus the inside wall of the pipe or tubing being inspected is reflected into the mirror or reflector from the outside diameter of the reflector to the center of the reflector without any obstruction of the view. The bulb 13 is preferably hooded or shaded as at 14 and held in place by means of the bayonet connection 15. Of course the latter means of attachment is not absolutely necessary and any other suitable means of attachment may be used. The bulb 13 is mounted sufficiently close to the mirror 12 so as to have its light reflected into the mirror and yet not too close so as to thereby interfere with seeing the full image comprising the entire inner peripheral surface of the tubing being inspected, and located between the mirror 12 and the bulb 13. At the opposite end portion of the carriage 9, mounted upon the tubular extension 16, the boss 17 is positioned and to which the handle 18 is preferably mounted pivotally as at 19. The handle 18, with such desired extension as may be necessary, depending upon the length of pipe being inspected, is used to propel the carriage upon its rollers along the interior of the pipe. As indicated, the outer portion of the carriage 9 is telescopically mounted at 20 (see Fig. 3) upon the tubing 16. Thus the telescopic movement of the carriage 9 upon the tubing 16 allows for raising or lowering the rollers 10 in their mounting upon the pivotably movable levers 11, the springs 21 providing for the desired tension therebetween. After proper adjustment for the desired compression of the springs, the latter are held in place upon the tubing 16 by means of the setscrews 22. For the purpose of supplying electric current to the light bulb 13, the electric wiring 23 is mounted within the interior of the tubing 16 and is preferably guided for its entire length, as indicated.

As shown more clearly in detail in Fig. 3, the convex mirror 12 is suitably mounted upon the plate 24 which in turn is attached to the end portion 25 of the carriage by means of the screws 26. Thus it has been found that by means of the reflected light rays in the convex mirror face, minute surface inspection of the tubing interior is easily accomplished, so that when viewed through the telescope sight 5 the entire inner peripheral surface in the vicinity of the lamp and the mirror may be inspected at a glance. The inspection then proceeds longitudinally along the pipe interior by the simple expedient of having an attendant draw the combined mirror, carriage and bulb slowly through the tubing until its entire length has been traversed.

The focus of the telescope may likewise be made adjustable, as desired, to fit both the size of the tubing as well as the length, and therefore relatively easy inspection is made of variable and previously inaccessible interiors.

It is apparent that our invention may assume a wide variety of forms, and we desired, therefore, to be limited only to the following claims.

We claim:

1. In a device of the character described for examining the interior surfaces of pipes and the like, the combination of a partially hooded lamp adapted to be spaced centrally from the pipe walls, a carriage carrying the said lamp and longitudinally movable within the pipe, a convex reflector transversely mounted on an end portion of the said carriage, the said carriage having an extended portion whereby the said lamp is spaced a substantial distance beyond the convex surface of the said reflector and is mounted on the outer end of the extended portion, the convex surface of the said reflector being opposite to the portion of the lamp not hooded, the said extended portion including central mounting means on the said reflector for maintaining the said lamp spaced from the pipe walls whereby the peripheral portion of the reflector reflects an image of the pipe surface lying between the reflector and the lamp.

2. In a device for examining the interior surfaces of pipes and the like, the said device comprising a lamp spaced from the pipe walls, a convex reflector therefor, a carriage carrying the said lamp and the said reflector and having means for engagement with the interior surface of the pipe, independent means for supporting the said lamp in a position a substantial distance axially from the said convex reflector, the said reflector being mounted on an end portion of the said carriage and positioned relatively close to the carriage and away from the said lamp, central mounting means on the said reflector for maintaining the said lamp spaced from the pipe walls, lever means extending beyond the end of the said carriage and supported by the latter member, the said lever means extending substantially parallel to the axis of the said carriage for moving the said latter member longitudinally of the pipe as the surface examination interiorly progresses.

STANLEY ANDERSON.
FRANK F. KUHLMAN.
JOHN J. KOLAR.